March 7, 1939.  A. WHITELAW  2,149,483
FRICTION ELEMENT AND METHOD OF MAKING SAME
Filed May 28, 1936
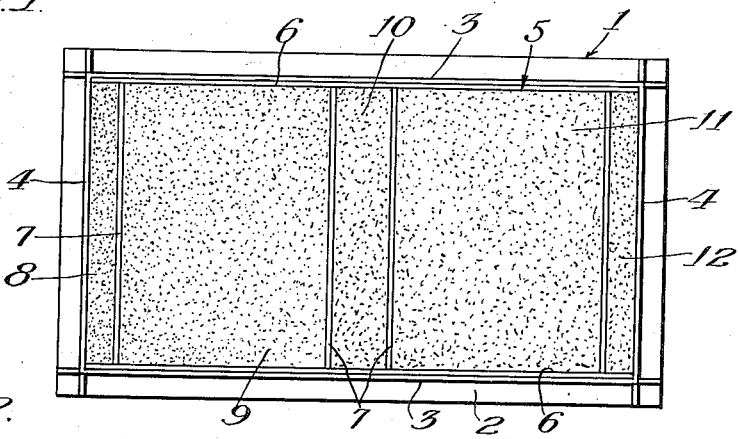
Fig. 1
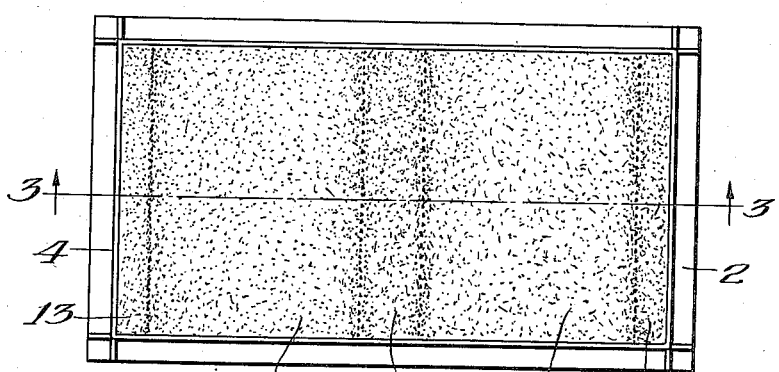
Fig. 2
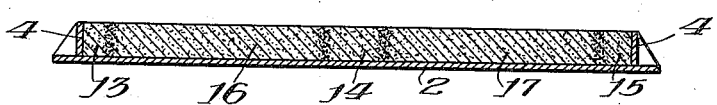
Fig. 3
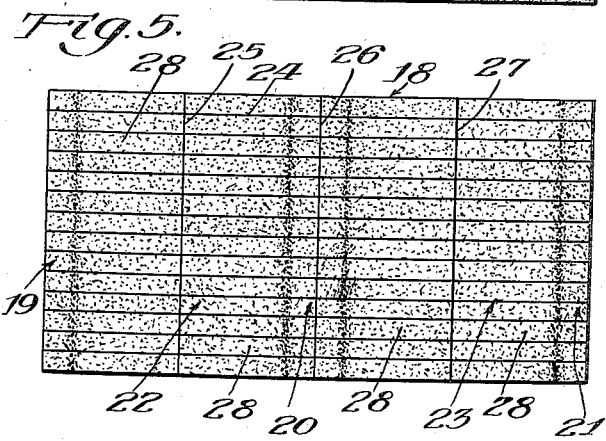
Fig. 4
Fig. 5
Fig. 6
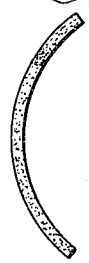
Fig. 7
Inventor:
Albert Whitelaw,
By Lee J. Gary
Attorney Patented Mar. 7, 1939

2,149,483

UNITED STATES PATENT OFFICE 2,149,483

FRICTION ELEMENT AND METHOD OF MAKING SAME

Albert Whitelaw, Passaic, N. J., assignor to Raybestos-Manhattan, Inc., Passaic, N. J., a corporation of New Jersey Application May 28, 1936, Serial No. 82,274

1 Claim. (Cl. 18—47.5)

This invention relates to improvements in friction elements of the molded or pressed type and a method of making the same, and refers specifically to a friction element of integral construction, portions of which have different physical characteristics and a method of making such elements by compressing the constituents thereof in the dry state.

It is frequently desirable in the use of friction elements to have portions of the friction element possessed of different physical characteristics than remaining portions thereof. For instance, in friction brakes, it frequently happens that portions of the brake lining are subjected to greater pressure than other portions thereof due to inherent characteristics of the brake mechanism. In order to secure uniform braking force, uniform lining wear and eliminate chattering or squealing, the expedient has heretofore been proposed of placing sections of lining having different frictional coefficients or having different properties of wear resistance at points upon the brake band wherein the greater or lesser pressure occurs. For instance, one expedient resides in placing sections of lining having a lesser coefficient of friction at a point on the brake band where greater pressure is exerted and placing sections of lining having a greater coefficient of friction at a point on the brake band where lesser pressure occurs.

However, it has heretofore been necessary to apply two or more linings upon the band, one having one set of physical characteristics and the remaining having different properties, or if one lining were provided, said lining would comprise two or more separate sections mechanically secured together by adhesion or rivets to form a unitary structure. In either case the desirable results obtained are secured at considerable increase in cost, both of material and labor.

My present invention contemplates the provision of a lining, portions of which have different physical properties, the lining being characterized in that it is integral as opposed to a composite mechanically united lining, and possesses no clearly defined line of demarcation between the different sections.

My present invention also contemplates a process for making such linings or elements, which is both simple and economical and is particularly characterized in that the friction element as a whole is constructed in a single process, that is, all sections of the element from the raw material stage to the finishing stage being treated similarly and simultaneously.

Other objects and advantages of my invention will be apparent from the accompanying drawing and following detailed description.

In the drawing,

Fig. 1 is a top plan view of an open mold into which the constituents of the friction material is charged, illustrating particularly the removable partitions.

Fig. 2 is a similar view illustrated with the partitions removed.

Fig. 3 is a sectional view taken on line 3—3 of Fig. 2.

Fig. 4 is a side elevational view of a compressed blank of friction material.

Fig. 5 is a top plan view of the blank illustrated in Fig. 4.

Fig. 6 is a face view of a friction element cut from the blank illustrated in Figs. 4 and 5 and bent into arcuate form.

Fig. 7 is a side elevational view of the element shown in Fig. 6.

Referring in detail to the drawing, 1 indicates an open top mold having a base plate 2 and sides 3, 3 and ends 4, 4. A frame 5 comprising longitudinal members 6 and cross members 7 of a height approximately equal to the walls 3 and 4 of the mold, is inserted into said mold so as to divide the same into compartments 8, 9, 10, 11 and 12.

The mix comprising the friction element is charged or loaded into the compartments of the mold in the dry state, the same being preferably accurately weighed and uniformly distributed in the various compartments. Since the materials loaded into the mold are to determine the resulting characteristics of the friction material, the properties of the materials loaded into the various compartments may be different. For example, the mix loaded into compartments 9 and 11 may be the same and the mix charged to compartments 8, 10 and 12 may be the same, but different from that loaded into compartments 9 and 11.

When a suitable quantity of the constituents have been thus charged to the mold, the frame 5 is removed permitting the mixes to flow or sift together to a certain degree. However, there will be no intimate intermingling of the bulks of the materials only along the lines of juncture of said bulks.

If, for example, it is desired to make a friction element having portions of different coefficients of friction, a mixture of dry asbestos, a thermo-plastic binder and a friction reducing agent, such as graphite or the like, may be charged to compartments 8, 10 and 12. In Figs. 2 and 3, this charge is designated 13, 14 and 15. A mixture of dry asbestos and a thermo-plastic binder may be charged to compartments 9 and 11 and is designated 16 and 17 in Figs. 2 and 3. The mixes are, as has been hereinbefore described, in the dry state and the masses are relatively fluffy and readily compressible.

After the frame 5 has been removed the mass 13, 14, 15, 16 and 17 is subjected to heat and pressure within the mold 1, the mass being compressed to about one-fifth its thickness. The application of the heat, of course, causes the binder to flow whereby an integral sheet 18 is formed. Due to localized intermingling of the mixes after the removal of the frame and also due to the limited flowing caused by the pressure and heat, a sheet is formed which comprises portions which partake principally of the characteristics of one mix and other portions which partake principally of the characteristics of the remaining mix or mixes with small areas of juncture between the different adjacent mixes which partake of the characteristics of the two adjacent mixes. Consequently, the sheet 18 is formed having portions of different characteristics, said portions being separated by shadowy areas along the line of juncture or mergence of the adjacent portions.

Referring particularly to Fig. 5, a sheet or blank 18 is shown having areas 19, 20 and 21 of, for instance, relatively low frictional characteristics, and areas 22 and 23 of relatively high frictional characteristics. The blank 18 may be die-cut or sawn along lines 24, 25, 26 and 27 to form a plurality of elements 28, each of which has a predominant section of relatively high friction coefficient and a tip of relatively low frictional coefficient. The elements 28 may then be placed in a mold, formed to arcuate shape, cured, sanded and bored or drilled and may be used as brake linings for automobiles or the like.

Although the blank 18 has been formed so that friction elements 28 may be cut therefrom which have a body of one set of properties and a tip having another set of characteristics, the materials comprising areas or portions 19, 20, 21, 22 and 23 may be arranged in any desired manner by merely using a different form of frame 5 having differently arranged partitions whereby the mixes may be locally segregated in the desired manner. Further, the mixes may differ as to physical characteristics other than frictional. For instance, one mix may have characteristics of high durability and the remaining mix or mixes, properties of low durability or one mix may form an abrasive substance whereas the other or others may have lubricating properties. Of course, the various combinations are manifold and cannot possibly be herein described.

As an example of one combination which may be used the following is set forth: A mix comprising ground or pulverized vulcanized rubber, asbestos fibre, pulverized resin, litharge and sulphur and a mix comprising ground or pulverized vulcanized rubber, asbestos fibre, pulverized resin, graphite, pulverized lead and sulphur. The first mix will result in a mass which has a high coefficient of friction and the last mentioned mix will result in a mass having a relatively low coefficient of friction. If brake segments were to be made of these mixes, the body or major portion of the element 28 would be formed of the first mix and the tip formed of the last mentioned.

Proportions of the above mixes which have been found suitable are as follows:

*Relatively high frictional coefficient*

| | By weight |
|---|---|
| Ground or pulverized vulcanized rubber | 20 |
| Short asbestos fibre | 50 |
| Synthetic pulverized resin | 18 |
| Litharge | 8 |
| Sulphur | 4 |
| | 100 |

*Relatively low frictional coefficient*

| | By weight |
|---|---|
| Ground or pulverized vulcanized rubber | 10 |
| Short asbestos fibre | 50 |
| Synthetic pulverized resin | 19 |
| Graphite | 10 |
| Pulverized lead | 8 |
| Sulphur | 3 |
| | 100 |

The pressure to which the mix or mixes are subjected, of course, will depend upon the characteristics of the mix or mixes and the characteristics desired in the resulting product. In addition, the properties of the mix or mixes, particularly those of the binder determines the temperature of flow and cure. The time of application of pressure and heat is also a function of the properties of the mix or mixes and the desired properties of the resultant product. In the specific example given herein a pressure in the neighborhood of 1,300 pounds per square inch at a temperature of about 275° to 300° F., for a period of about 4 to 5 minutes has proven satisfactory.

Of course, the above specific examples are not to be construed as limitations but are merely submitted for purposes of illustration. The broad concept of my invention contemplates the use of all conventional mixes in the dry state to form an integral friction element having two or more sections which differ from each other or one another on the basis of their physical properties.

By "thermo-plastic binder" as used in the specification and claim is meant a binder which can be rendered fluid by heat and/or pressure.

Of course, it is within the purview of my invention that the entire friction body be constructed from the same mix in which case the entire mold would be filled with a mix having the same characteristics and no separating frame would be used. The mix in this case, of course, would comprise a filler, and a thermo-plastic binder which is rendered fluid by heat and/or pressure.

I claim as my invention:

The method of making friction elements having a plurality of sections with different frictional characteristics, which comprises, forming a composite blank of friction material by placing a plurality of removable separating elements into a mould to divide the same into a plurality of compartments, charging certain of said compartments with different constituents to provide said different frictional characteristics, said constituents comprising fillers and thermo-plastic binders in dry, discrete particle form, said particles being readily movable with respect to one another, removing said separating elements from said mould and causing a limited substantially uniform intermingling of the particles of adjacent compartments in the space previously occupied by said separating elements, and subjecting the entire mass of particles to heat and pressure to compress the same and form an integral sheet-like blank; and then dividing said sheet-like blank into a plurality of friction elements so that each of said elements includes a minor portion having one set of frictional characteristics and a major portion having a different set of frictional characteristics.

ALBERT WHITELAW.